Patented Feb. 26, 1946

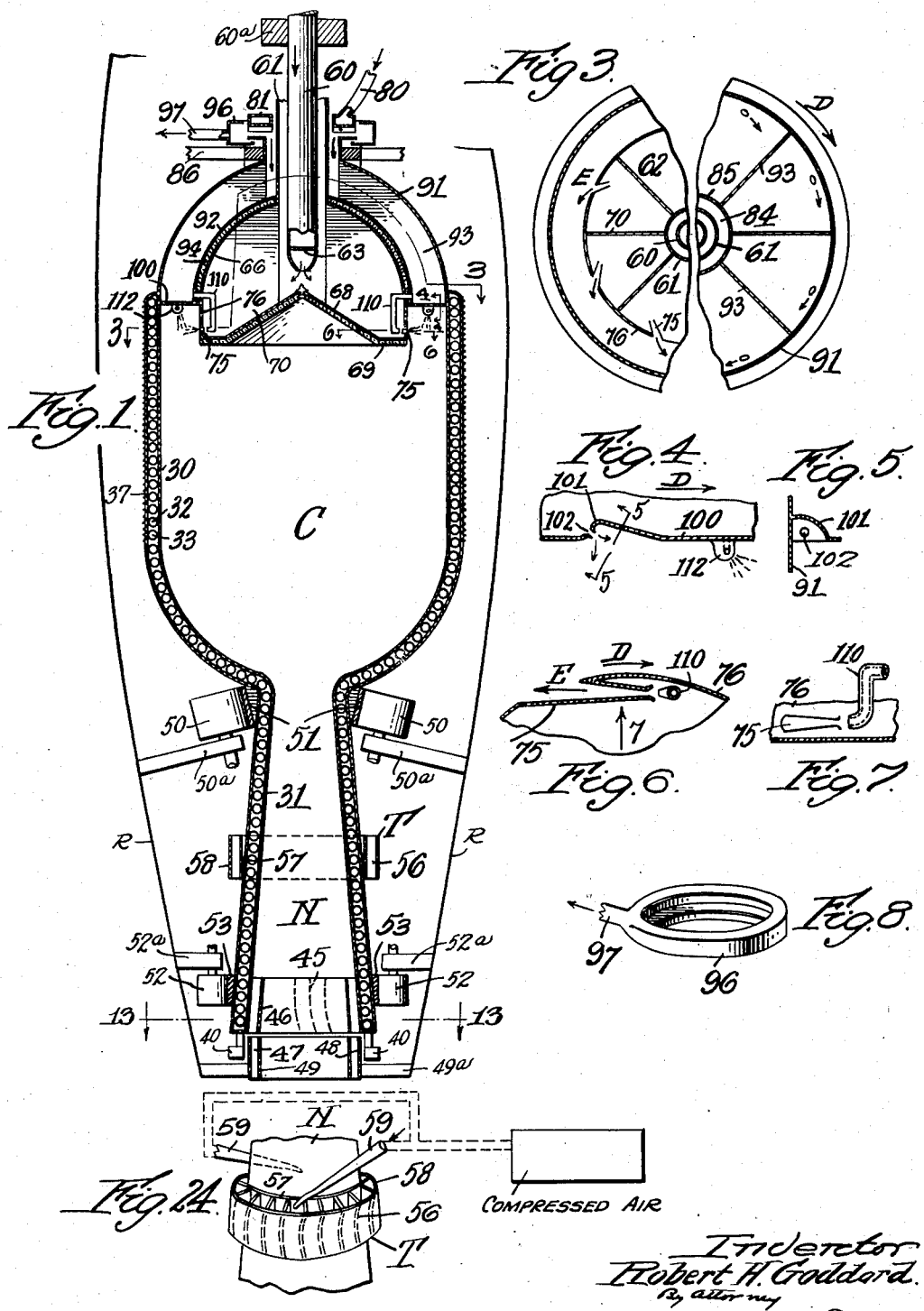

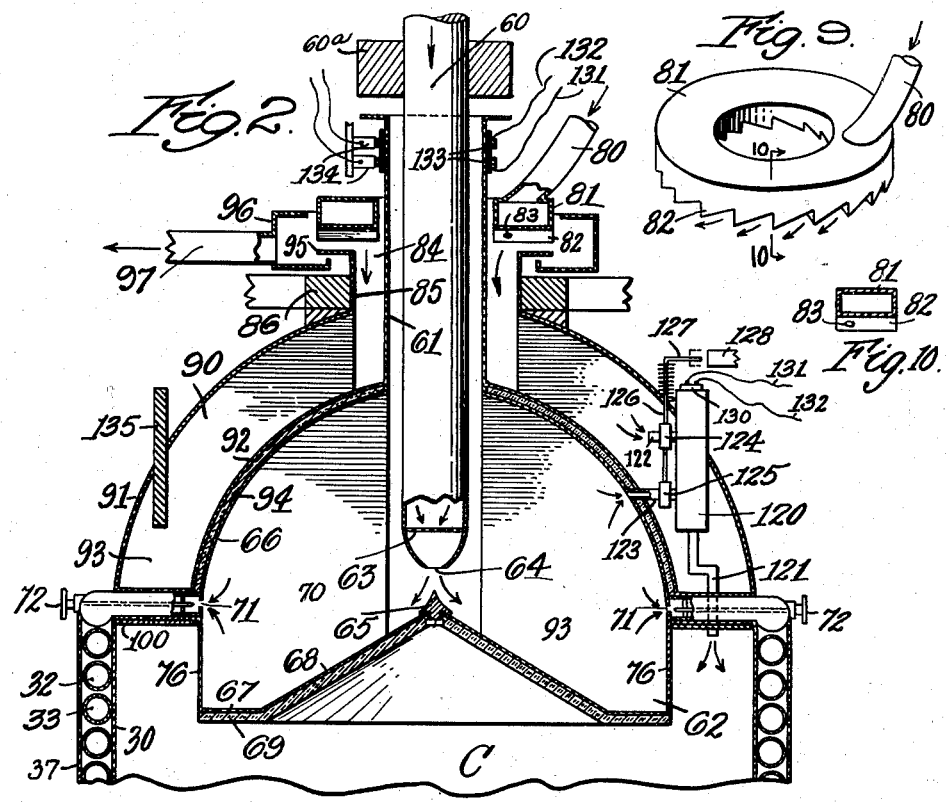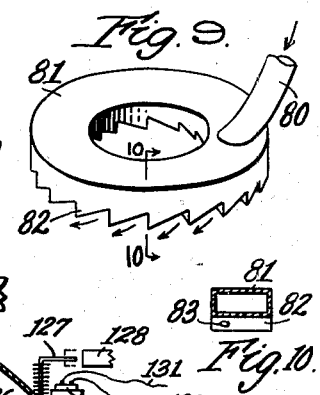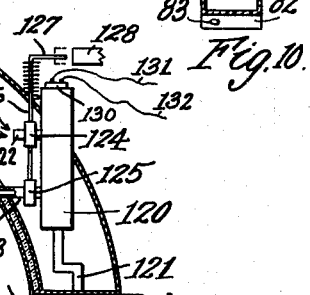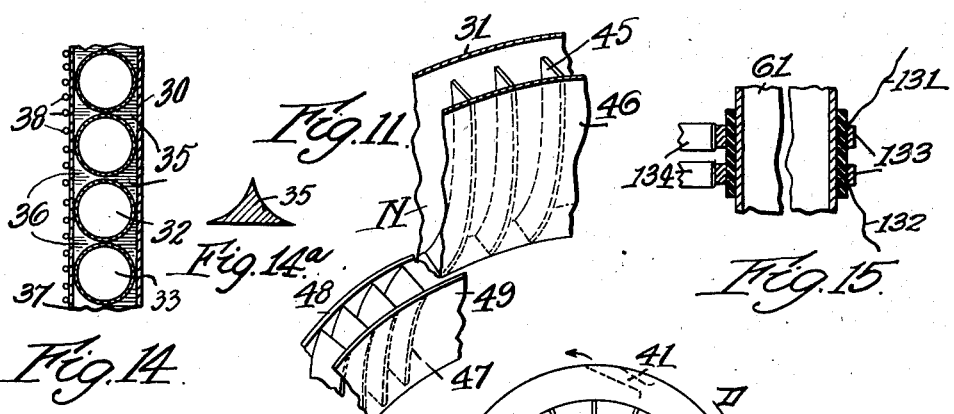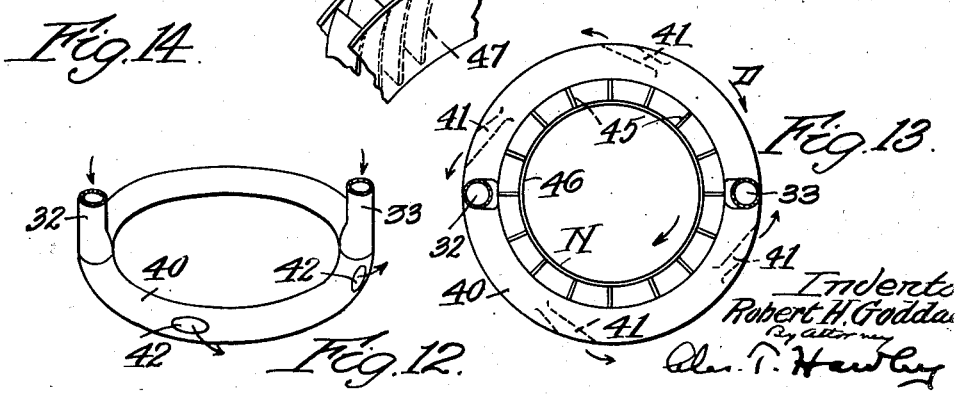

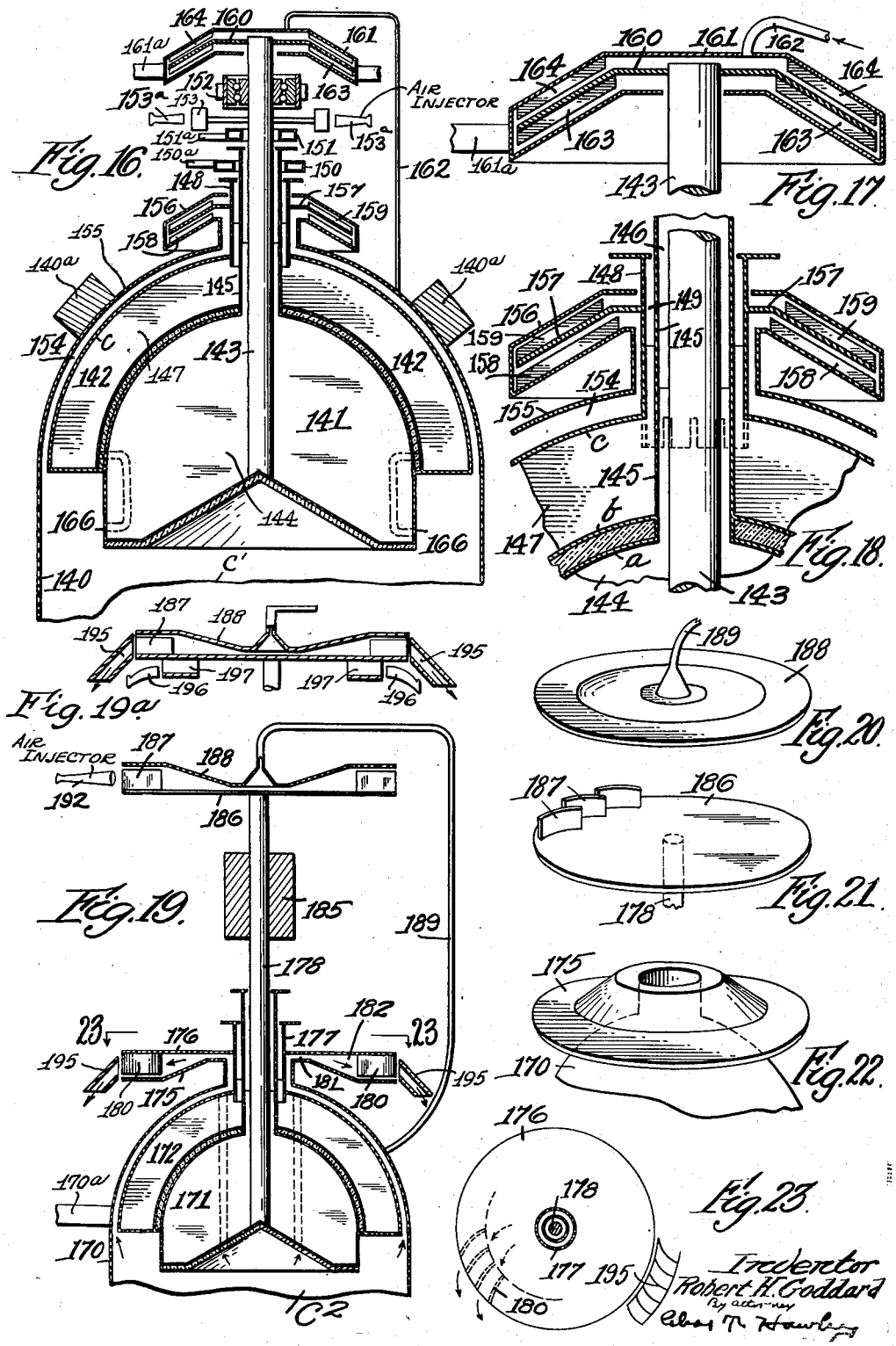

2,395,403

UNITED STATES PATENT OFFICE 2,395,403

ROTATABLE COMBUSTION APPARATUS FOR AIRCRAFT

Robert H. Goddard, Roswell, N. Mex., assignor of one-half to The Daniel and Florence Guggenheim Foundation, New York, N. Y., a corporation of New York Application March 6, 1939, Serial No. 259,946

10 Claims. (Cl. 60—35.6)

This invention relates to combustion apparatus particularly designed for use in aircraft having the rocket type of propulsion. In such craft, combustion gases in large volume are continuously discharged from a rearwardly open nozzle, and these gases are commonly produced by combustion of two liquids, such as gasoline and liquid oxygen, at a very high temperature. Satisfactory performance requires that all parts of the combustion apparatus shall be as light as possible, and that the two liquids shall be brought together and thereafter intermingled in a most thorough and effective manner.

The production of a very thin and light combustion chamber and the effective cooling of the thin chamber wall forms the subject matter of my prior Patents Nos. 2,016,921 and 2,085,800. The pumping of the very cold liquid oxygen involves a serious problem, one solution of which is disclosed in my prior Patent No. 2,127,865 on a special type of centrifugal pump. I have also provided for reenforcing and cooling a thin and light combustion chamber by a tubular external winding of special construction fully disclosed in my prior Patent No. 2,122,521.

It is the general object of my present invention to combine certain features from these prior patents in an improved combustion apparatus, which also includes new and novel features not previously disclosed.

One important feature of my present invention relates to the provision of rotating parts in a combustion apparatus, by rotation of which the gasoline and oxygen will be most intimately intermingled, and which rotating parts also form effective substitutes for the centrifugal pumps previously required.

My invention further relates to arrangements and combinations of parts which will be hereinafter described and more particularly pointed out in the appended claims.

Preferred forms of the invention are shown in the drawings, in which:

Fig. 1 is a sectional front elevation of one form of combustion apparatus embodying my improvements;

Fig. 2 is a partial sectional elevation of the upper part of said combustion apparatus, on an enlarged scale and taken on a different diameter;

Fig. 3 is a sectional plan view, taken along the irregular line 3—3 in Fig. 1;

Fig. 4 is a detail sectional view, taken along the line 4—4 in Fig. 1;

Fig. 5 is a detail sectional view, taken along the line 5—5 in Fig. 4;

Fig. 6 is an enlarged sectional view, taken along the line 6—6 in Fig. 1;

Fig. 7 is a detail side elevation, looking in the direction of the arrow 7 in Fig. 6;

Fig. 8 is a perspective view of a collecting chamber to be described;

Fig. 9 is a perspective view of an annular gasoline feed member to be described;

Fig. 10 is a detail sectional elevation, taken along the line 10—10 in Fig. 9;

Fig. 11 is a partial perspective view of fixed and movable vane structures to be described;

Fig. 12 is a perspective view of an annular member forming the lower terminus of certain cooling coils;

Fig. 13 is a plan view, taken substantially along the line 13—13 in Fig. 1;

Fig. 14 is an enlarged vertical sectional elevation of a portion of the combustion chamber wall and associated cooling structure;

Fig. 14a is a detail sectional view of a metal packing ring to be described;

Fig. 15 is an enlarged sectional elevation of certain commutator connections to be described;

Fig. 16 is a partial sectional front elevation, showing a modified construction;

Figs. 17 and 18 are enlarged sectional elevations of certain parts appearing in Fig. 16;

Fig. 19 is a partial sectional front elevation, showing a further modification;

Fig. 19a is a detail sectional view of a modification of certain parts shown in Fig. 19;

Figs. 20, 21 and 22 are perspective views of certain elements appearing in Fig. 19;

Figs. 23 is a sectional plan view, taken along the line 23—23 in Fig. 19; and

Fig. 24 is a perspective view of a turbine for starting the rotating apparatus shown in Fig. 1.

Referring particularly to Figs. 1, 2 and 3, I have shown a preferred form of my improved combustion apparatus, which comprises a rotatable combustion chamber C having an outwardly expanding rotatable nozzle portion N.

The combustion apparatus is mounted with the longitudinal axis of the chamber C and nozzle N in alignment with or parallel to the longitudinal axis of the rocket craft in which the apparatus is mounted. This is the usual arrangement of rocket apparatus, as shown for instance in my prior Patents Nos. 1,834,149 and 1,879,187. The body of the craft is indicated generally at R in Fig. 1.

The chamber C and nozzle N are formed with thin metal walls or casings 30 and 31 respectively, and these wall portions are enclosed within a double pitch helical winding of small coiled tubes 32 and 33. These tubes are preferably reenforced and supported by inner triangular metal strips 35 (Figs. 14 and 14a) and by outer triangular metal strips 36, the latter being inserted between the tubes 32 or 33 and an outer thin metal wall or casing 37, as disclosed and explained in my Patent No. 2,122,521. The casing 37 is preferably spirally wound with small steel wires 38 for reenforcement, as described in my prior Patent No. 2,109,529.

The triangular strips 35 and 36 not only support the tubes 32 and 33 but also greatly facilitate heat transfer thereof. When the apparatus is in use, a cooling fluid such as liquid oxygen circulates through the tubes 32 and 33 as will be hereinafter described.

At their lower ends, the tubes 32 and 33 connect with a hollow ring 40 (Fig. 12) having a series of outwardly opening nozzles 41 (Fig. 13) which communicate with ports 42 through which the somewhat heated oxygen escapes in an anticlockwise direction, while the ring 40 and chamber C rotate clockwise.

The casing 31 of the nozzle N (Figs. 11 and 13) is provided near its lower or open end with a series of vanes 45 (Figs. 11 and 13) having their inner edges supported by a shroud 46. The vanes 45 are curved as indicated in Fig. 11, and are engaged by the cooler outer portions of the gases escaping from the chamber C through the nozzle N. The vanes 45 thereby produce rapid rotation of the combustion apparatus by the reaction of said gases.

Increased axial propulsive force on the rocket or rocket craft may be obtained by providing a second series of oppositely curved vanes 47 (Figs. 1 and 11), mounted between non-rotatable shrouds or bands 48 and 49 having fixed supports 49ª. This latter structure may be supported below the nozzle N by rods 49ª attached to any non-rotating part of the aircraft in which my apparatus is installed. The vanes 47 cause the combustion gases to be ejected directly rearward and parallel to the direction of flight of the craft.

The combustion chamber C and nozzle N are rotatably supported on a series of rollers 50 mounted in fixed bearings 50ª and engaging an annular bearing member 51 suitably secured at the meeting portion of the combustion chamber C and nozzle N, as shown in Fig. 1. Additional rollers 52 mounted in fixed bearings 52ª similarly engage an annular bearing member 53 secured to the nozzle N near its lower or open end. The rollers 50 also support the weight of the rotating apparatus when not in operation.

In order to produce initial rotation of the apparatus, I provide a small auxiliary turbine T (Figs. 1 and 24) comprising a series of vanes 56 enclosed between inner and outer shrouds 57 and 58 and secured to the outer surface of the nozzle N. Compressed air from any suitable source may be delivered through nozzles 59 (Fig. 24) to the buckets of the turbine T to produce initial rotation.

I will now described the means which I have provided for supplying gasoline and liquid oxygen to the rotating combustion chamber.

Oxygen is supplied in liquid form through a pipe 60 (Fig. 2) which may be secured to a fixed support 60ª and which extends in spaced relation through a sleeve 61 to an oxygen chamber 62. A grid or strainer 63 may be provided at the lower end of the pipe 60, which is sharply contracted to provide a delivery nozzle or opening 64.

As the liquid oxygen escapes through the opening 64, it impinges on a conical spreader 65 and flows outward by centrifugal action into the oxygen chamber 62. This chamber is enclosed by a semi-spherical top portion 66, secured to the lower end of the sleeve 61, and a bottom portion 67 having an upwardly extending cone-shaped middle portion 68. Heat-insulating material 69 protects the bottom portion 67 from the direct heat of the combustion chamber.

Vanes 70 (Fig. 3) in the oxygen chamber 62 cause the oxygen delivered from the nozzle or opening 64 to rotate at high speed with the combustion apparatus.

The liquid oxygen in the chamber 62 will thus be under considerable pressure, due to this rapid rotation and centrifugal action.

A small portion of this oxygen under pressure will enter the coiled tubes 32 and 33 through small valve openings 71 (Fig. 2) controlled by hand-operated needle valves 72. These valves are set to provide a desired flow of oxygen through the tubes 32 and 33 for cooling purposes.

The larger portion of the liquid oxygen is forced outward into the combustion chamber through nozzles 75 (Figs. 6 and 7) in the side walls 76 which form a downward extension of the hemispherical upper wall 66. The direction of rotation of the apparatus is clockwise or in the direction of the arrow D in Fig. 6, while the liquid oxygen escapes in the opposite direction as indicated by the arrow E.

Gasoline is delivered through a pipe 80 (Fig. 2) to an annular gasoline feed member 81, best shown in Fig. 9. This member 81 comprises a flat hollow ring of rectangular cross section, provided with saw tooth projections 82 on its lower face. Each projection has an orifice 83 in its upright edge, from which gasoline is delivered under light pressure to an annular passage 84 between the sleeve 61 and an outer sleeve 85 which is rotated in a thrust bearing 86. This latter bearing also resists the "lift" of the rotating combustion apparatus.

The gasoline is delivered through the passage 84 into a gasoline chamber 90 comprising an outer dome-shaped casing 91, an inner dome-shaped casing 92, and a series of spacing vanes 93 (Fig. 3). The casing 92 is preferably separated from the casing 66 previously described by a layer of heat-insulating material 94 (Fig. 2).

The upper end of the sleeve 85 is out-turned to provide a flange 95 (Fig. 2) which extends over the flanged lower inner edge of an annular gasoline collecting chamber 96 (Figs. 2 and 8) to which is connected an over-flow pipe 97. The flange 95 acts as a centrifugal slinger to throw any excess gasoline outward into the collecting chamber 96, if gasoline is supplied through the pipe 80 more rapidly than it can be ejected from the rotating gasoline chamber 90.

The lower end of the rotating gasoline chamber 90 is closed by a flat ring or plate 100 in which are provided a series of indented and forwardly projecting nozzle portions 101 (Figs. 4 and 5) having openings 102 through which gasoline is delivered to the combustion chamber forwardly or in the direction of the arrow D. The gasoline is forced out by the pressure due to centrifugal force developed by high speed rotation of the combustion chamber.

The gasoline delivered through the nozzle openings 102 escapes adjacent the outer wall of the chamber C and flows along the wall circumferentially, thus providing a cooling and protecting film therefor.

Branch pipes or small nozzles 110 (Figs. 1 and 7) conduct small portions of gasoline to the inlets of the oxygen nozzles 75, and the resulting partial combustion produces sufficient expansion of gases in the nozzles 75 so that a substantial oxygen travel is produced in a direction reverse to rotation, and the two combustion elements are effectively mixed. The nozzles 110 will of course be carefully heat-insulated where they pass into the oxygen chamber, so that the gasoline will not freeze and clog the nozzles.

It has been found desirable to provide additional gasoline to speed up combustion in the upper part of the combustion chamber C, and for this reason I provide supplementary nozzles 112 (Figs. 1 and 4) which project below the ring or plate 100 and direct a part of the gasoline directly into the blasts of oxygen delivered from the oxygen nozzles 75.

In order to start combustion in my apparatus, I provide an igniter 120 (Fig. 2) similar in construction to that disclosed in my prior Patent No. 2,090,039. This igniter is placed in the gasoline chamber 90 and has a delivery tube 121 extending into the combustion chamber C.

Gasoline enters the igniter through a pipe 122, and oxygen enters through a pipe 123 which is suitably jacketed in the gasoline space. Valves 124 and 125 control the flow of gasoline and oxygen respectively, and these valves are both connected to a spring-actuated valve rod 126 having an offset portion 127 adapted to be engaged by a block or arm 128 when the latter is manually moved inward from normal inoperative position to the dotted line position in Fig. 2.

The arm 128 does not rotate with the combustion apparatus, so that the offset portion 127 of the valve rod will be engaged by the operatively positioned arm 128 at each revolution of the combustion chamber and the parts supported thereby. The valves 124 and 125 will thus be momentarily opened to admit small portions of gasoline and oxygen to the igniter 120.

The mixture is fired by a spark-plug 130, connected by wires 131 and 132 to commutator rings 133 mounted on and suitably insulated from the upper end of the rotating sleeve 61 and engaged by fixed brushes 134 (Fig. 2). A counterweight 135 is provided to offset the weight of the igniter 120.

It will be understood that the igniter is used only for a brief period when starting the apparatus, and that both combustion and rotation are self-sustained after operation is well begun.

In the construction shown in Figs. 16 to 18, the casing 140 of the combustion chamber C' is stationary as shown by brackets 140ª, and the oxygen chamber 141 and gasoline chamber 142 are similar in construction to the chambers 62 and 90 previously described but are mounted to rotate with an upright supporting shaft 143.

The spaced vanes 144 (Fig. 18) in the oxygen chamber 141 have inward and upward extensions which are secured to the shaft 143 which is spaced from a concentric sleeve 145, thus providing an annular inlet passage 146 for the liquid oxygen to the chamber 141. The outer casing wall $a$ of the chamber 141 and the inner casing wall $b$ of the chamber 142 are fixed to the lower end of the sleeve 145.

The spaced vanes 147 in the gasoline chamber 142 have inward and upward extensions which are secured to the outside of the sleeve 145. A second sleeve 148 is spaced from the sleeve 145 to provide an annular inlet passage 149 for the gasoline to the chamber 142. The sleeve 148 is fixed to the outer casing wall $c$ of the chamber 142 and is slotted at its lower end to receive the upper edges of the vanes 147 (Fig. 18).

The oxygen and gasoline pass to the chambers 141 and 142 respectively through longitudinal passages between the parts of the vanes 144 and 147 which are attached to the shaft 143 and to the sleeve 145. Gasoline is supplied from a fixed annular feed member 150 supported at 150ª and oxygen from a fixed annular feed member 151 supported at 151ª, these parts being similar in construction and operation to the feed member 81 previously described and as shown in detail in Figs. 9 and 10.

Ball bearings 152 (Fig. 16) are provided for the shaft 143, and a turbine 153 is also provided for producing initial rotation, this turbine being energized by compressed air injected through nozzles 153ª, all as previously described.

To avoid friction, a substantial space 154 (Fig. 16) is left between the outer surface $c$ of the rotating gasoline chamber 142 and the inner surface of the hemispherical upper part 155 of the casing 140 of the stationary combustion chamber C'.

In order to keep combustion gases from escaping upward through this open space or passage 154, I provide a liquid seal comprising a stationary annular sealing chamber 156 (Fig. 18) supported on the upper stationary part 155 of the combustion chamber wall 140, and I provide a flange or disc 157, mounted on the rotating sleeve 148 and extending into the sealing chamber 156. Stationary vanes 158 and movable vanes 159 are provided on the lower casing wall of the chamber 156 and on the disc 157 respectively.

A sealing liquid, preferably mercury, is provided in the outer and lower portion of the chamber 156, which chamber is preferably of conical section so that the mercury will not escape readily when the apparatus is at rest. Centrifugal force tends to move the sealing liquid to the outer wall of the chamber 156 when the apparatus is in use and the liquid there coacts with the edge portion of the disc 157 to form an effective seal. The operation of such a sealing device is explained in detail in my prior Patent No. 2,127,865.

In order to counterbalance the upward pressure on the disc 157, I provide a similar disc 160 secured at the upper end of the shaft 143 and similarly rotatable in a stationary liquid seal chamber 161 supported at 161ª, connected by a pipe 162 to the space 154 which communicates with the combustion chamber. Vanes 163 and 164 are provided on the disc 160 and sealing chamber 161 respectively, the operation being the same as previously described.

If the discs 157 and 160 are of equal size, the pressure on the top of the disc 160 will neutralize the upward pressure on the disc 157, so that free and easy rotation of the oxygen and gasoline chambers is permitted.

The manner of delivery of oxygen and gasoline to the combustion chamber is substantially the same as previously described, except that a larger amount of gasoline is delivered to the nozzles 166 at the lower part of the oxygen chamber, so that a greater amount of combustion gas is produced, which reacts in the nozzles to produce continued rotation of the parts shown in Fig. 16, the remaining portion of oxygen being injected directly into the chamber C'.

A further modification of my invention is shown in Figs. 19 to 23, in which the casing 170 of the combustion chamber C² is stationary and supported at 170ª, and the oxygen chamber 171 and gasoline chamber 172 rotate as in the construction last described.

In this construction, however, the sealing means to prevent upward escape of gases from the combustion chamber C² is omitted, and the gases are allowed to escape but are then utilized to operate turbines which in turn furnish power to rotate the oxygen and gasoline chambers. Two turbines are preferably provided, with the parts oppositely arranged to neutralize the pressure of the exhaust gases.

The lower turbine comprises a coned disc 175 fixed to the upper part of the stationary casing 170, and a flat disc 176 fixed to a sleeve 177 and rotatable with the shaft 178 and chambers 171 and 172.

The flat disc 176 is provided with vanes or blades 180 on its lower face and the gases escaping outwardly through a restricted annular passage 181 and an outwardly expanded annular passage 182 engage the vanes 180 and produce rapid rotation of the oxygen and gasoline chambers.

The shaft 178 extends upward through a bearing 185 and is provided with a flat disc 186 at its upper end having vanes or blades 187 on its upper surface, which vanes rotate adjacent an inverted fixed disc 188, similar in construction to the fixed disc 175 previously described and having a pressure connection 189 from its axial portion to the combustion chamber $C^2$.

The outwardly escaping gases move the vanes 187 in the same direction as that in which the lower turbine moves the vanes 180, but the pressure against the upper rotating disc 186 is downward, while the pressure against the lower rotating disc 176 is upward.

This turbine construction can also be utilized for starting purposes by providing nozzles 192 (Fig. 19) through which compressed air may be injected to engage the vanes 187 and initially rotate the disc 186 and associated parts. Additional blades 195 may be provided outside of the path of rotation of the vanes 180 and 187, and these additional blades may be so disposed as to direct the escaping gases downward or axially of the shaft 178, thus utilizing the remaining energy of the gases for additional propulsion. If the fixed blades 195 are used, special nozzles 196 may direct air against supplementary vanes 197 for starting purposes, as shown in Fig. 19a.

Having described the details of construction of several forms of my invention in which either the complete combustion apparatus or the oxygen and gasoline feeding portions thereof continuously rotate, I will now explain the use and advantages of my improved construction.

It will be obvious that the mechanism is very much simplified, as the rotating chambers in themselves act as centrifugal pumps and take the place of the oxygen and gasoline pumps previously required. A most intimate mixture of the gasoline and oxygen prior to combustion is also attained. In the form of my invention in which the combustion chamber itself rotates, centrifugal force in the combustion chamber assists in maintaining a cooling film of gasoline over the side wall of the combustion chamber.

It is also an advantage that both the gasoline and oxygen may be supplied to the apparatus at low or atmospheric pressure but will nevertheless be delivered to the combustion chamber under very substantial pressures developed by centrifugal force.

The delivery of oxygen in a direction opposite to the rotation of the parts, and the delivery of gasoline in the same direction of rotation greatly improves the intimate mixing of these two elements, which result would not be obtained in like degree if both gasoline and oxygen were delivered in the same circumferential direction.

By utilizing the centrifugal or pumping action of the rotating oxygen and gasoline chambers for delivery of the combustion elements to the combustion chamber, I not only simplify the mechanism but I also accomplish self-regulation of the pumping action.

The liquids are assumed to be supplied through the inlet pipes at uniform rates of flow. If, now, the rotating parts rotate too slowly, the liquids, being fed to these rotating parts at constant rates through the supply pipes, will accumulate in the pump chambers, and will consequently build up centrifugal force due to the increased head, in spite of the lower speed of rotation. Larger quantities of gasoline and oxygen will then be delivered to the combustion chamber, producing more active combustion and an increase in pressure of combustion gases in the chamber. This will consequently increase the force on the driving turbine vanes 45, so that the speed of rotation will increase until it returns to normal value.

Furthermore, if the chambers as a unit tend to rotate too rapidly, the pressure and rate of discharge of both liquids will increase, thus reducing the supply in the rotating chambers, for the reason that there is no increase in the rate of supply through the inlet pipes 60 and 80. This in turn reduces the centrifugal force, with consequent sharp reduction in the rate of delivery to the combustion chamber. As the rate of delivery is thus reduced, the volume and pressure of the resulting combustion gases will also decrease, and the speed of rotation will correspondingly decrease until it returns to normal value.

Having thus described my invention and the advantages thereof, I do not wish to be limited to the details herein disclosed, otherwise than as set forth in the claims, but what I claim is:

1. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, said combustion chamber being mounted to rotate about the axis of the nozzle, and said supply means for the two liquids being aligned with the axis of said nozzle and chamber and forming a single rotating unit with said combustion chamber.

2. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, said combustion chamber being mounted to rotate about the axis of the nozzle, and said supply means for the two liquids being aligned with the axis of said nozzle and chamber and forming a single rotating unit with said combustion chamber, and the means to rotate the supply means and combustion chamber as a unit being actuated by combustion gases ejected from the combustion chamber through the reaction nozzle.

3. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, devices being provided to direct the discharge of one of said liquid elements forwardly in the direction of rotation of said rotating supply means and relative thereto and into said chamber, and additional devices being provided to direct the discharge of the other liquid element opposite to the direction of rotation of said rotating supply means and relative thereto and into said chamber, whereby intermingling of said two liquids is facilitated.

4. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, one of said supply means having nozzle outlets directed rearward relative to the direction of rotation of said supply means, and means being provided to supply small portions of the liquid in the other supply means to said nozzle outlets to support combustion thereat and to thereby develop pressure in said nozzle outlets which will discharge additional parts of said first liquid from said outlets into said combustion chamber in a direction reverse to the direction of rotation of said supply means.

5. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, said combustion chamber being mounted to rotate about the axis of the nozzle, and the supply means for the two liquids being aligned with the axis of said nozzle and chamber and forming a single rotating unit with said combustion chamber and nozzle, and said nozzle having curved internal vanes engageable by the combustion gases escaping from said chamber through said nozzle and constituting some part of the means which revolves the rotating unit.

6. Combustion apparatus for a rocket-propelled aircraft comprising a combustion chamber having a reaction nozzle aligned therewith and discharging toward the rear of said craft, separate supply chambers to provide liquid fuel and a very cold liquid oxidizing agent to said combustion chamber, said supply chambers being mounted in direct communication with a part of said combustion chamber remote from said nozzle and being mounted for free rotation relative to said aircraft and about an axis substantially parallel to the longitudinal axis of said craft, a pair of turbines associated with said supply chambers and effective to rotate said supply chambers as a unit, means to cause the liquids in said supply chambers to rotate with said supply chambers and to be thereby injected into said combustion chamber by centrifugal force to form a combustible mixture, and operating gas connections from said combustion chamber to said two turbines, the external reactions of said two turbines being in opposite axial directions and being substantially equal, whereby the end thrusts of said turbines in the unit rotated thereby are balanced against each other.

7. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion of the peripheral areas of said supply means, and said rotating supply means being thereby effective to separately inject said two liquids into said combustion chamber to form a combustible mixture therein, the supply means comprising separate supply chambers, each having an outwardly convex dome-shaped outer casing for maximum resistance to internal pressure, and said dome-shaped casings being concentric with each other and with the longitudinal axis of said combustion chamber.

8. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, the supply means comprising separate supply chambers, each having an outwardly convex dome-shaped outer casing for maximum resistance to internal pressure, and said dome-shaped casings being concentric with each other and with the longitudinal axis of said combustion chamber and being mounted within the dome-shaped upper end of said combustion chamber but separated therefrom to provide a dome-shaped space open to combustion chamber pressure, whereby the pressure of the combustion gases on said supply chambers is substantially balanced.

9. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, the supply means comprising separate concentric supply chambers, and each supply chamber having a series of small discharge openings adjacent its lower edge, through which openings said liquid fuel and said liquid oxidizing agent are delivered as sprays to said combustion chamber and intermingled therein to form a combustible mixture.

10. Combustion apparatus for a rocket-propelled aircraft comprising a combustion chamber having a reaction nozzle associated therewith and discharging toward the rear of said craft, separate means to directly supply liquid fuel and a very cold liquid oxidizing agent to said chamber, means to mount said supply means at a part of said chamber remote from said nozzle and for free rotation relative to said aircraft, means to rotate said supply means, and means to cause said liquids to rotate with said supply means, whereby the pressures on said two liquids in said supply means are increased by the centrifugal forces developed by rotation of said liquids in and with said supply means, said centrifugal forces being exerted directly and separately on said two liquids, said liquids leaving said supply means and entering said chamber through openings adjacent the peripheries of said supply means, which openings are of small cross section in proportion to the peripheral areas of said supply means, and said rotating supply means being thereby effective to separately inject said two liquids into said combustion chamber to form a combustible mixture therein, said means to rotate the supply means being actuated by combustion gases ejected from the combustion chamber through the reaction nozzle and comprising a series of movable turbine blades in said reaction nozzle effective to divert the ejected combustion gases from their normal axial rearward path, and a series of fixed blades axially aligned with the nozzle and movable blades and by which the combustion gases leaving said movable blades are redirected toward their initial axial rearward path and thus provide an element of forward propulsive force for said craft.

ROBERT H. GODDARD.